(12) United States Patent
Louden

(10) Patent No.: US 6,199,510 B1
(45) Date of Patent: Mar. 13, 2001

(54) FEED DISH FOR ANIMAL CAGES

(75) Inventor: Richard E. Louden, North Lewisburg, OH (US)

(73) Assignee: Louden Bros. Tool Co., Inc., North Lewisburg, OH (US)

( * ) Notice: Subject to any disclaimer, the term of this patent is extended or adjusted under 35 U.S.C. 154(b) by 0 days.

(21) Appl. No.: 09/522,124

(22) Filed: Mar. 9, 2000

(51) Int. Cl.$^7$ ..................................................... A01K 39/01
(52) U.S. Cl. ......................................................... 119/51.01
(58) Field of Search ............................... 119/51.01, 51.5, 119/52.1, 52.2, 52.3, 52.4, 53.5, 54, 57.8, 57.9, 61, 456, 454, 467, 468, 469, 475, 477

(56) References Cited

U.S. PATENT DOCUMENTS

| | | |
|---|---|---|
| 3,185,133 | 5/1965 | Bird . |
| 3,299,839 | 1/1967 | Nordbak . |
| 3,477,677 | 11/1969 | Hindley . |
| 4,995,337 | * 2/1991 | Abrams et al. .......................... 119/18 |
| 5,018,480 | * 5/1991 | Goldman et al. ....................... 119/26 |
| 5,323,733 | 6/1994 | Youngs-McVicker . |
| 5,351,645 | * 10/1994 | Brennon ................................. 119/18 |
| 5,669,329 | * 9/1997 | Krause ................................. 119/72.5 |
| 5,870,969 | * 2/1999 | Boyce .................................... 119/61 |

FOREIGN PATENT DOCUMENTS 654720   3/1994  (JP) .

* cited by examiner

Primary Examiner—Thomas Price
(74) Attorney, Agent, or Firm—Biebel & French

(57) ABSTRACT

A feed dish for use in combination with a cage having a cage side formed as a lattice of horizontal and vertical members. The feed dish includes a bowl and mounting structure wherein the mounting structure includes a pair of elongated leg members having enlarged end portions. The mounting structure further includes a slide member having a pair of slots for engaging over the leg members wherein the slide member is retained on the leg members between the bowl and the enlarged portions to retain the bowl in engagement with the side of a cage with the leg members extending through the lattice structure.

6 Claims, 4 Drawing Sheets

FEED DISH FOR ANIMAL CAGES

BACKGROUND OF THE INVENTION

The present invention relates generally to an animal or watering dish and, more particularly, to a dish including mounting means for facilitating mounting the dish to the side of a cage defined by a lattice structure.

It is well known to provide feed dishes for cages containing small birds or animals wherein the dish is adapted to be mounted to the side of the cage. Known feed dishes utilize a number of different designs and mechanisms for attaching the dishes to the side of a cage. For example, a known mounting structure is provided for engaging between two adjacent vertical elements of a cage lattice structure, and another known mounting structure includes members for hanging the dish from a horizontally extending element of the cage structure. Typically, there is a trade-off between securely mounting the dish or feeder to the side of the cage and providing for ease of removal of the dish, such as may be necessary for refilling or cleaning the dish.

In a recently proposed structure, disclosed in U.S. Pat. No. 5,832,872, a mounting structure integrally formed with the feeding dish is described, including a threaded male member which is adapted to extend through the side of a cage and be engaged by a cooperating threaded female member to thereby retain the dish in position on the cage. The design of such a mounting structure requires facility in rotating threaded members, which in certain circumstances may hinder use of the feeder due to the particular location of the cage and/or abilities of the person attending to the feeder.

Accordingly, there remains a need for a feed dish which may be securely mounted to the lattice structure of an animal cage, and which is further characterized by a mechanism which is easily and quickly manipulated to mount and dismount the feed dish relative to the cage side.

SUMMARY OF THE INVENTION

The present invention provides a feed dish for use in combination with a cage having a cage side formed as a lattice of horizontal and vertical members. The feed dish includes a bowl and a mounting structure for attaching the bowl to a cage side wherein the bowl is formed with a side wall and a bottom connected to the side wall to define an area for retaining food or water. The mounting structure includes an elongated leg structure integrally formed with the side wall and extending from the side wall through the lattice of the cage side. The leg structure includes an enlarged portion located at an end of the leg structure distal from the side wall.

The mounting structure further includes a slide member for engaging the leg structure in linear sliding movement. In use, the bowl is positioned with the leg structure extending through the cage side, and the slide member engages over the leg structure in linear sliding movement perpendicular to the leg structure and parallel to the side wall whereby the slide member is located between the side wall and the enlarged portion to wedge the cage side between the slide member and the side wall.

In the preferred embodiment, the leg structure comprises a pair of leg members located in horizontally spaced relation to each other, and the enlarged portion includes a flange member extending horizontally in a perpendicular direction from each of the leg members. The slide member is formed as a planar element including top and bottom edges wherein a pair of slots are formed extending upwardly from the bottom edge toward the top edge for engaging over the leg members.

The design of the present feed dish provides for ease of placement of the feed dish in association with the side of a cage, and further provides for ease of secure attachment of the feed dish by placement of the slide member in association with the leg structure through simple linear movement of the slide member relative to the leg structure.

Therefore, it is an object of the present invention to provide a feed dish which is easily attached to the side of a cage defined by a lattice structure.

It is a further object of the invention to provide such a feed dish with a mounting structure which is operated with a minimum of manipulation while providing a secure mounting for the feed dish.

Other objects and advantages of the invention will be apparent from the following description, the accompanying drawings and the appended claims.

DETAILED DESCRIPTION OF THE PREFERRED EMBODIMENT

Figure 1:
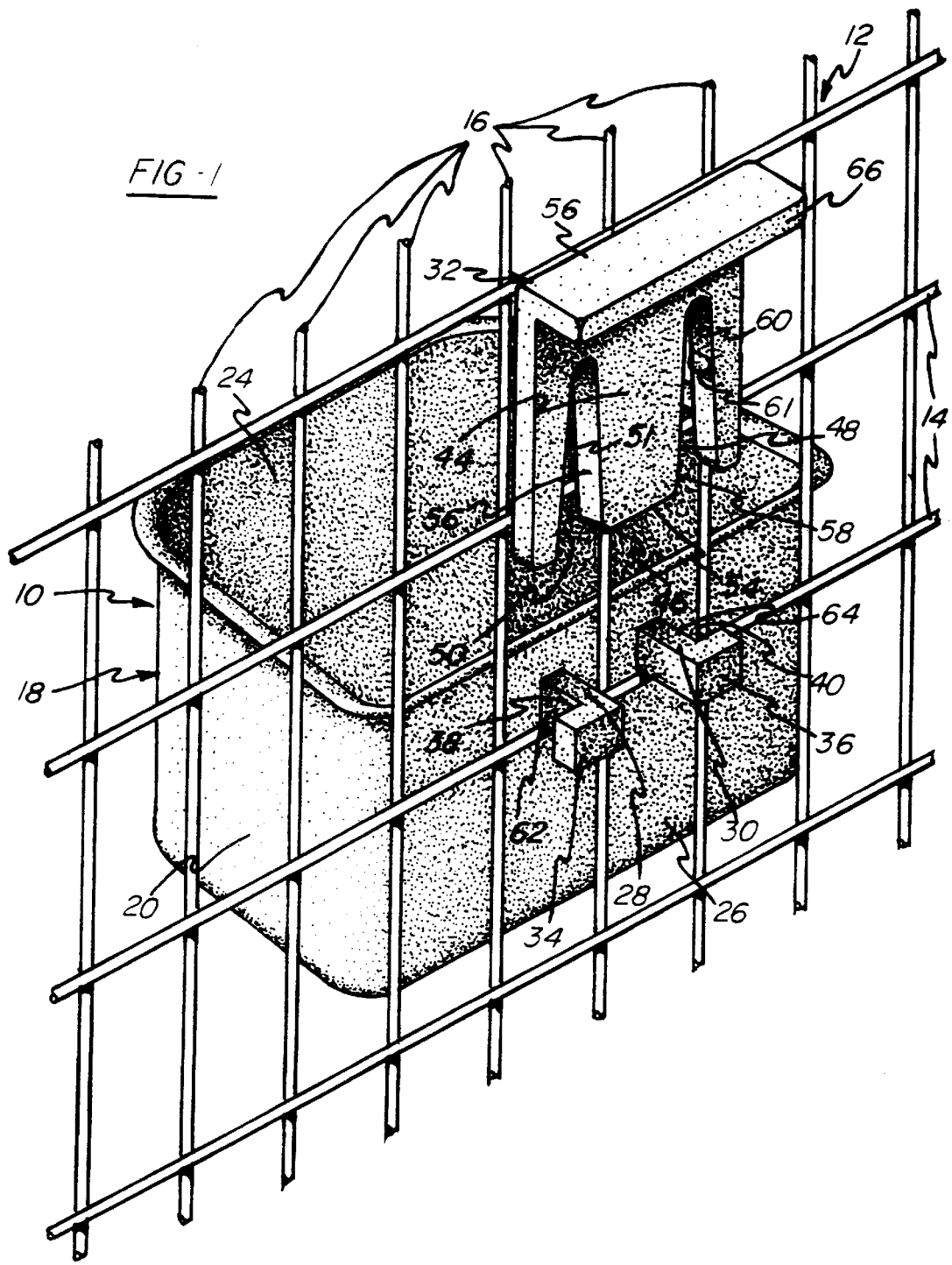
FIG. 1 is a partially exploded rear perspective view of the feed dish showing the mounting structure prior to attachment to the side of a cage.

Referring initially to FIG. 1, an animal feed dish 10 in accordance with the present invention is illustrated in association with an animal cage side 12 formed as a lattice structure of interconnected horizontal elements 14 and vertical elements 16.

Figure 2:
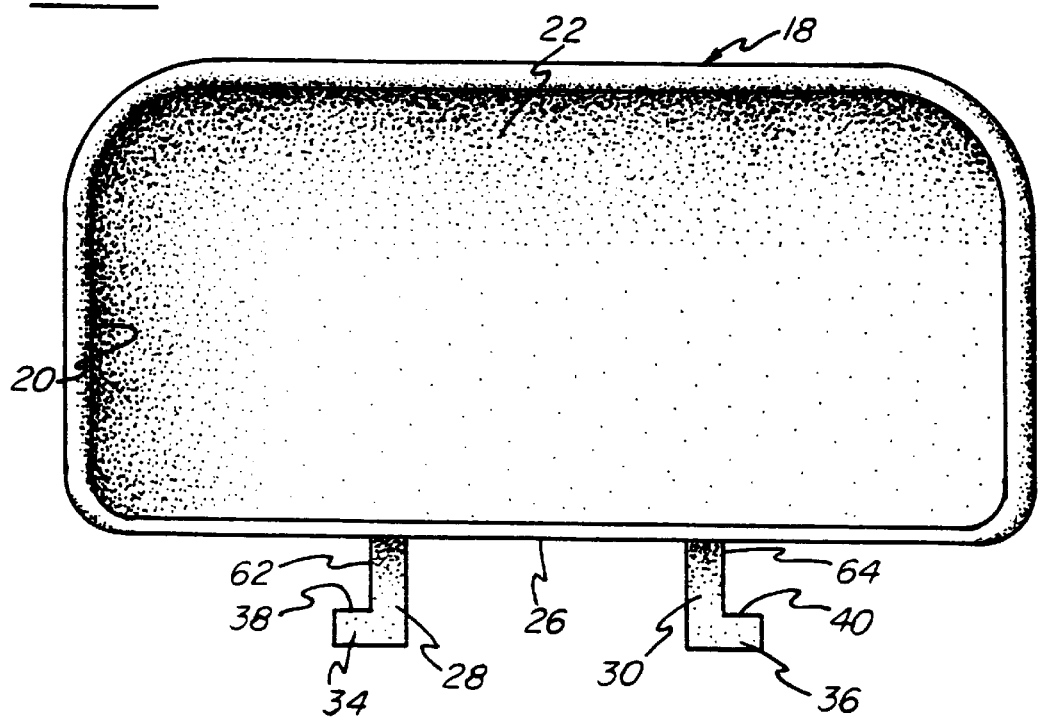
FIG. 2 is a top plan view of the bowl for the present invention.

Referring additionally to FIG. 2, the feed dish 10 comprises a bowl 18 defined by a side wall 20 and a bottom 22 connected to the side wall for retaining food or water therein, and further including an open top area 24 for access to the interior of the bowl 18. The side wall 20 of the bowl 18 includes a flat rear portion 26 corresponding to the planar configuration of the cage side 12. It should be understood that within the scope of the present invention, the rear portion 26 may be configured differently to correspond to other cage side shapes, such as by being provided with a curvature to correspond to a curved cage side.

The feed dish 10 is further provided with a mounting structure including an elongated leg structure defined by a pair of horizontally spaced, elongated legs 28, 30, and a slide member 32. The legs 28, 30 are formed integrally with and extend perpendicularly from the rear portion 26 of the bowl 18, and in the preferred embodiment, the bowl 18 and legs 28, 30 are molded of an ABS plastic, as is the slide member 32.

The leg members 28, 30 each terminate in a respective flange member 34, 36 defining an enlarged portion for the leg structure at an end of the leg structure distal from the rear portion 26 of the bowl 18. The flange members 34, 36 each define a respective wall 38, 40 extending horizontally in a perpendicular direction from the leg members 34, 36, respectively.

Figure 3:
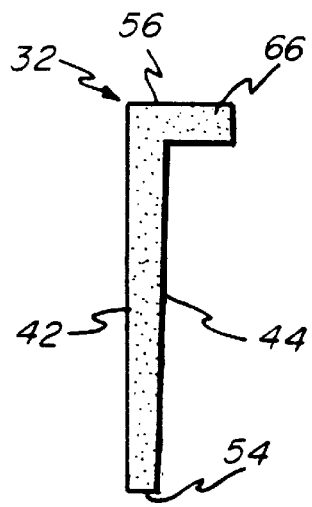
FIG. 3 is a side elevational view of the slide member for the mounting structure.

Referring to FIGS. 1 and 3, the slide member 32 in the illustrated embodiment of the invention comprises a generally planar member defined by a front planar face 42 and a rear planar face 44. The slide member 32 includes a slot structure defined by a pair of horizontally spaced slots 46, 48 wherein the slot 46 is defined by a pair of opposing walls 50, 52 which taper toward each other in a direction from a bottom edge 54 of the slide member 32 toward a top edge 56 thereof. Similarly, the slot 48 is defined by a pair of opposing walls 58, 60 which taper in toward each other in the direction from the bottom edge 54 toward the top edge 56. The slots 46, 48 are sized to receive the legs 28, 30 therein, and the spacing between the wall 50 of the slot 46 and the wall 60 of the slot 48, at the upper ends thereof, generally corresponds to the spacing between the outer surface 62 of the leg 28 and the outer surface 64 of the leg 30. Also, it should be noted that each of the walls 50, 60 are provided with a respective protrusion 51, 61 (FIGS. 1 and 4) for providing a snap fit connection to retain the slide member 32 on the legs 28, 30.

The slide member 32 is further provided with a ledge portion 66 extending laterally along and rearwardly from the upper edge 56. The ledge portion 66 provides an engagement surface for facilitating tactile manipulation of the slide member 32.

Figure 4:
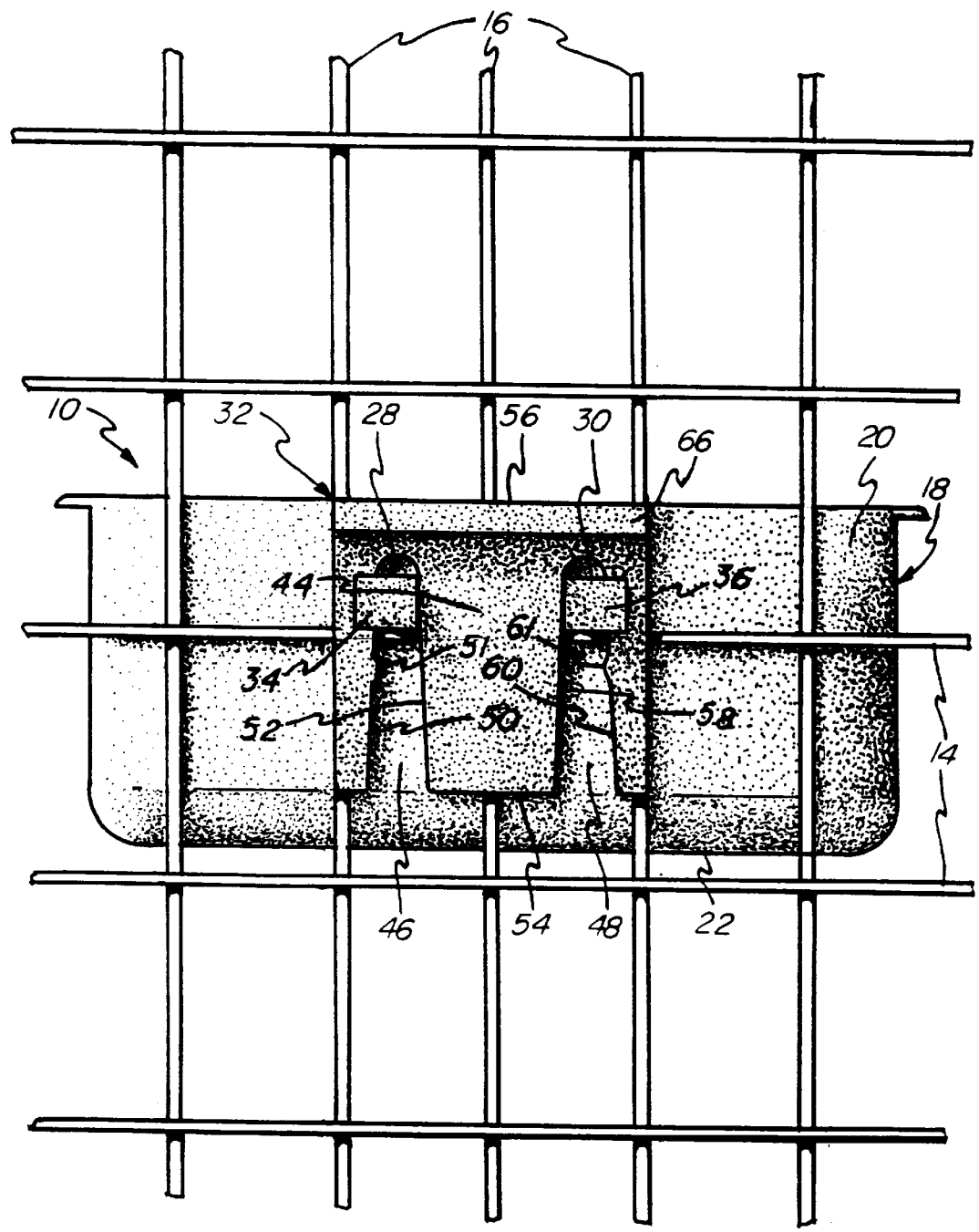
FIG. 4 is a rear elevational view of the feed dish with the mounting structure supporting the dish on a cage side.
Figure 5:
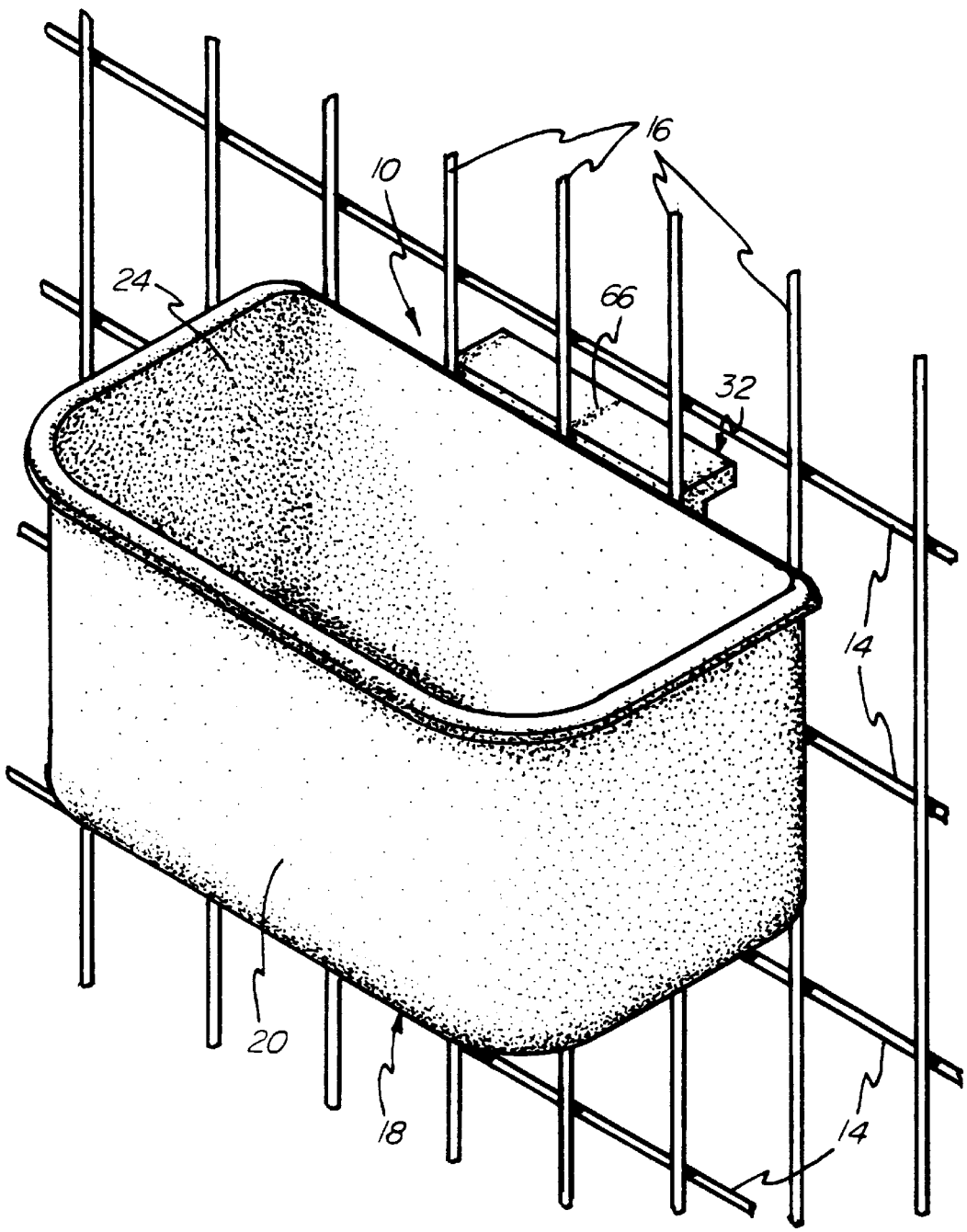
FIG. 5 is a front perspective view showing the feed dish attached to the side of a cage.

Referring to FIGS. 4 and 5, the dish 10 of the present invention is shown mounted to a cage side 12 wherein the leg members 28, 30 are positioned above one of the horizontal elements 14 and extending through the lattice defined by the horizontal and vertical elements 14, 16. With the rear portion 26 of the bowl 18 positioned in engagement with the cage side 12, the slide member 32 is moved downwardly to engage the slots 46, 48 over the respective leg members 28, 30. As the slide member 32 is moved downwardly into position, the rear wall 44 is located in engagement with the walls 38, 40 of the flange members 34, 36, adjacent the respective slot walls 52, 58, to thereby retain the slide member 32 in position on the legs 28, 30. In this position, the front face 42 of the slide member 32 faces toward the rear portion 26 of the bowl 18 and engages the cage side 12 therebetween to thereby wedge the bowl 18 up against the cage side 12.

Removal of the feed dish 10 from the cage side 12 is the reverse of installation wherein a person may engage the underside of the ledge portion 66 to lift the slide member 32 upwardly and disengage the slots 46, 48 from the legs 28, 30.

From the above description, it should be apparent that the present invention provides a convenient and easily manipulated mounting structure for mounting a feed dish to a cage side. In particular, the present invention provides a slide member 32 which is moved in linear movement parallel to the side wall 20 of the bowl 18 in order to engage the slots 46, 48 with the leg members 28, 30, and that such engagement between the slide member 32 and the legs 28, 30 may be performed by persons of even limited tactile ability for manipulating objects. Further, it should be apparent that although the present mounting structure provides an easily manipulated securing means for a feed dish, the ease of installation does not detract from the security of the installation and that the feed dish of the present invention will remain securely in position until such time as the slide member 32 is detached from the leg members 28, 30.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A feed dish for use in combination with a cage having a cage side formed as a lattice of horizontal and vertical members, said feed dish comprising:
   a bowl and a mounting structure for attaching the bowl to a cage side;
   the bowl comprising a sidewall and a bottom connected to the sidewall;
   the mounting structure comprising an elongated leg structure extending from the sidewall for extending through the lattice of the cage side, said leg structure comprising a pair of elongated legs, each leg including a respective enlarged portion located distal from said sidewall;
   the mounting structure further including a slide member for engaging the leg structure in linear sliding movement wherein said slide member comprises a top edge and a bottom edge and includes a pair of slots extending from said bottom edge toward said top edge for engaging over said legs in linear sliding movement perpendicular to said leg structure and parallel to said sidewall whereby said slide member is located between said sidewall and said enlarged portions of said legs.

2. The feed dish of claim 1 wherein said slide member comprises a generally planar member.

3. The feed dish of claim 1 wherein said slide member comprises a generally planar member having a planar front face and a planar rear face and engagement of said pair of slots with said legs locates said rear face in engagement with said enlarged portions and locates said front face in a position facing said sidewall to engage a cage side located between said sidewall and said slide member.

4. The feed dish of claim 1 wherein each said slot includes a protrusion for providing a snap fit connection for retaining said slide member on said legs.

5. A feed dish for use in combination with a cage having a cage side formed as a lattice of horizontal and vertical members, said feed dish comprising:
   a bowl and a mounting structure for attaching the bowl to a cage side;
   the bowl comprising a sidewall and a bottom connected to the sidewall;
   the mounting structure comprising a pair of elongated leg members spaced from each other in a horizontal direction and extending perpendicularly from the sidewall for extending through the lattice of the cage side;
   an enlarged portion comprising a flange member located at an end of each of said leg members distal from said sidewall;
   each said flange member defining a wall extending horizontally in a perpendicular direction from a respective leg member;
   the mounting structure further comprising a slide member defined by a generally planar member having a front face, and rear face, a top edge and a bottom edge, and a pair of horizontally spaced slots extending from said bottom edge toward said top edge, each of said slots defined by a pair of opposing walls which taper toward each other in the direction from said bottom edge toward said top edge;
   wherein said slots of said slide member engage over said leg members in linear sliding movement perpendicular to said leg structure and parallel to said sidewall with said rear face engaged against said horizontally extending walls of said flange members and said front face positioned facing said sidewall to engage a cage side located between said sidewall and said slide member.

6. A feed dish for use in combination with a cage having a cage side formed as a lattice of horizontal and vertical members, said feed dish comprising:

a bowl and a mounting structure for attaching the bowl to a cage side;

the bowl comprising a sidewall and a bottom connected to the sidewall;

the mounting structure comprising an elongated leg structure extending from the sidewall for extending through the lattice of the cage side, said leg structure including an enlarged portion located at an end of said leg structure distal from said sidewall;

the mounting structure further including a slide member for engaging the leg structure in linear sliding movement wherein said slide member comprises a top edge and a bottom edge and includes a slot structure extending from said bottom edge toward said top edge for engaging over said leg structure in linear sliding movement perpendicular to said leg structure and parallel to said sidewall whereby said slide member is located between said sidewall and said enlarged portion; and wherein said slot structure includes a protrusion for providing a snap fit connection for retaining said slide member on said leg structure.

\* \* \* \* \*